US008997583B2

United States Patent
Lang (10) Patent No.: US 8,997,583 B2
(45) Date of Patent: Apr. 7, 2015

(54) ULTRASONIC FLOW SENSOR FOR USE IN A FLUID MEDIUM

(75) Inventor: Tobias Lang, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 227 days.

(21) Appl. No.: 13/508,322

(22) PCT Filed: Sep. 22, 2010

(86) PCT No.: PCT/EP2010/063957
§ 371 (c)(1),
(2), (4) Date: Jul. 23, 2012

(87) PCT Pub. No.: WO2011/054595
PCT Pub. Date: May 12, 2011

(65) Prior Publication Data
US 2012/0272749 A1    Nov. 1, 2012

(30) Foreign Application Priority Data
Nov. 6, 2009  (DE) .......................... 10 2009 046 468

(51) Int. Cl.
*G01F 1/66* (2006.01)

(52) U.S. Cl.
CPC ..................................... *G01F 1/662* (2013.01)

(58) Field of Classification Search
CPC ............ G01F 1/66; G01F 1/668; G01F 1/662
USPC .......................................... 73/861.25–861.31
See application file for complete search history.

(56) References Cited

U.S. PATENT DOCUMENTS

| 4,882,931 | A  | * | 11/1989 | Breeuwer ................... 73/861.27 |
| 5,502,652 | A  | * | 3/1996  | Hoggatt et al. ............... 702/136 |
| 5,969,263 | A  | * | 10/1999 | Ligneul et al. ............. 73/861.25 |
| 6,026,693 | A  | * | 2/2000  | Baumoel et al. ........... 73/861.27 |
| 7,254,493 | B1 | * | 8/2007  | Pelletier ......................... 702/47 |
| 2001/0015107 | A1 | * | 8/2001 | Feller ........................ 73/861.27 |
| 2004/0123666 | A1 | * | 7/2004 | Ao et al. ........................ 73/644 |
| 2004/0129088 | A1 | * | 7/2004 | Moscaritolo et al. ...... 73/861.25 |
| 2005/0166684 | A1 | * | 8/2005 | Hirayama et al. ......... 73/861.25 |

(Continued)

FOREIGN PATENT DOCUMENTS

| DE | 39 41 544  | 6/1991 |
| DE | 100 57 342 | 5/2002 |

(Continued)

OTHER PUBLICATIONS

English Translation of DE 10057342 A1, Kettner et al, May 2002.*

*Primary Examiner* — Harshad R Patel
*Assistant Examiner* — Philip Cotey
(74) *Attorney, Agent, or Firm* — Kenyon & Kenyon LLP (57) ABSTRACT

An ultrasonic flow sensor for use in a fluid medium is described. The ultrasonic flow sensor includes at least two ultrasonic converters which are situated in a flow tube offset relative to one another, longitudinally with respect to a flow of the fluid medium. The ultrasonic flow sensor also includes a reflection surface, the ultrasonic converters being set up to exchange ultrasonic signals via simple reflection on the reflection surface. In addition, a deflection device is provided between the ultrasonic converters which is set up to essentially suppress parasitic ultrasonic signals, which are reflected from the reflection surface and which strike the deflection device, by deflection away from the ultrasonic converters.

9 Claims, 11 Drawing Sheets

(56) References Cited

U.S. PATENT DOCUMENTS

| | | | |
|---|---|---|---|
| 2006/0156827 A1* | 7/2006 | Lang et al. | 73/861.25 |
| 2006/0156828 A1* | 7/2006 | Konzelmann et al. | 73/861.25 |
| 2007/0261501 A1* | 11/2007 | Lang | 73/861.27 |
| 2008/0271544 A1* | 11/2008 | Rickli | 73/861.28 |
| 2009/0100940 A1* | 4/2009 | Strunz et al. | 73/861.28 |
| 2009/0178490 A1* | 7/2009 | Konzelmann et al. | 73/861.29 |

FOREIGN PATENT DOCUMENTS

| | | |
|---|---|---|
| DE | 10 2004 060118 | 6/2006 |
| DE | 10 2005 038599 | 2/2007 |
| DE | 10 2007 030071 | 11/2008 |
| EP | 0 477 418 | 4/1992 |
| JP | 2003-194603 | 7/2003 |
| JP | 2004-233121 | 8/2004 |

* cited by examiner

FIG. 22B

ULTRASONIC FLOW SENSOR FOR USE IN A FLUID MEDIUM

FIELD OF THE INVENTION

The present invention relates to an ultrasonic flow sensor for use in a fluid medium

BACKGROUND INFORMATION

Numerous flow sensors are believed to be understood from the related art for detecting the flow of a fluid medium. These types of ultrasonic flow sensors are understood to detect, for example, a mass flow, a volume flow, or a velocity of the fluid medium, for example in a flow tube. Two or more ultrasonic converters are usually used, which are situated in the flow offset relative to one another, longitudinally with respect to the flow of the fluid medium, and which are able to exchange ultrasonic signals. Based on differences in the propagation times of the ultrasonic signals having a component in the flow direction and having a component against the flow direction, the flow rate and/or other variables which characterize the flow may be deduced.

One example of this type of ultrasonic flow sensor (which within the scope of the exemplary embodiments and/or exemplary methods of the present invention described herein may also be modified according to the exemplary embodiments and/or exemplary methods of the present invention) is discussed in DE 39 41 544 A1. This publication discusses an ultrasonic flow meter having multiple reflections of the ultrasonic signals between the ultrasonic converters. This results in a W-shaped ultrasonic path in the measuring tube, which offers the advantage of a longer sound path and a converter installation that is flush with the wall.

However, one disadvantage of these reflection devices is that reflection surfaces, several of which are understood to be required in DE 39 41 544 A1, may reduce the robustness of the system. In particular, the reflection surfaces, exactly three of which are required in the described configuration, are sensitive to vibrations, may influence the flow conditions, and are susceptible to contamination and the associated changes in the reflectivity, or to thermal distortion.

SUMMARY OF THE INVENTION

Accordingly, an ultrasonic flow sensor is described herein which at least largely avoids the disadvantages of known ultrasonic flow sensors. However, the ultrasonic flow sensor based on a reflection principle provides an unambiguous ultrasonic transmission path. The ultrasonic flow sensor is set up for use in a fluid medium. For example, this fluid medium may flow through a flow tube, whose integral part may be a measuring tube, for example, which is introduced into the flow tube and/or is an integral part of the flow tube. The ultrasonic flow sensor may be used in particular in the automotive field, for example in motor vehicle internal combustion engines, in particular in the fresh air tract thereof, in particular downstream from a turbocharger, and in particular in the utility vehicle sector. Examples of alternative fields of application are sensors for gases or liquids, for example in process engineering, for example for process control systems, applications as distance sensors, as fill level sensors, as flow sensors in the chemical and pharmaceutical industries, as sensors in medical technology, for example in respiratory gas monitors, or applications in energy technology, for example as heat meters in power plants or in residences.

The ultrasonic flow sensor includes at least two ultrasonic converters which are situated in a flow tube offset relative to one another, longitudinally with respect to a flow of the fluid medium. For example, the ultrasonic converters may be completely or partially embedded in the wall of a measuring tube of the flow tube, i.e., for example of a section of the flow tube or of a measuring tube which is separately embedded in the flow tube. The ultrasonic converters may also be accommodated in a housing part, which as a plug-in sensor is attached to the actual flow tube or measuring tube or is embedded therein. In this case, a wall of the housing part may also be understood to be a part of the flow tube or the measuring tube. A configuration which is offset longitudinally with respect to the flow is understood to mean a configuration in which one of the ultrasonic converters is situated upstream from the other, it being possible for the configuration to be provided exactly in the flow direction, or, as described in greater detail below, offset relative to one another transverse to the flow direction.

Within the scope of the exemplary embodiments and/or exemplary methods of the present invention, an ultrasonic converter is generally understood to mean a device which is able to convert electrical signals into ultrasonic signals and/or vice versa. For example, an ultrasonic converter may include at least one converter core in which at least one electric acoustic converter element is accommodated. One example of this type of electric acoustic converter element is a piezoelectric element. However, other electric acoustic converter elements may be used. With regard to possible configurations of the ultrasonic converters, reference may be made, for example, to the above-mentioned related art or to other known ultrasonic converters.

The ultrasonic flow sensor also includes a reflection surface. A reflection surface is understood to mean a surface which is set up to completely or partially reflect ultrasonic signals. For example, this reflection surface may be part of the flow tube, for example part of the measuring tube, or may also be introduced separately into the measuring tube, for example as a reflection surface which is situated within the flow of the fluid medium. The reflection surface may also be affixed to a housing part which also accommodates the ultrasonic converters, and which as a plug-in sensor is attached to the actual flow tube or measuring tube or is inserted therein. The ultrasonic converters are set up to exchange ultrasonic signals via simple reflection on the reflection surface.

In other words, this means that, in contrast to the W-shaped pattern of the system illustrated in DE 39 41 544 A1, within the scope of the exemplary embodiments and/or exemplary methods of the present invention a V-shaped pattern of the ultrasonic signals between the ultrasonic converters is provided as a particular propagation path. The ultrasonic converters may also be installed in such a way that they are slightly tilted with respect to the ideal V-shaped pattern, as the result of which, for example, a stop against beam drifts during flow may be provided, and/or multiple reflections between the two converter surfaces may be reduced.

In addition, a deflection device is provided between the ultrasonic converters. As described in greater detail below, this deflection device may, for example, be part of a measuring tube and/or a wall of a measuring tube in which the ultrasonic converters are inserted. However, other configurations are also possible in principle. The deflection device is set up to essentially suppress parasitic ultrasonic signals, which are reflected from the reflection surface and which strike the deflection device, by deflection away from the ultrasonic converters. In other words, the deflection device is set up to suppress, for example, W-shaped signal patterns or other signal patterns having a multiple reflection, including the measuring tube surface between the ultrasonic converters. "Essential" suppression is understood to mean suppression in which the sound energy of the parasitic ultrasonic signals is suppressed by at least 30%, which may be by at least 50%, and particularly may be by at least at least 80% or even by at least 90%, compared to a system without a deflection device, i.e., for example compared to a smooth measuring tube surface between the ultrasonic converters.

The deflection device may in particular be situated at least in a middle third of a connecting distance between the ultrasonic converters. However, the deflection device may also extend over the entire distance between the ultrasonic converters, or over some other portion of this distance. The deflection device may particularly be situated essentially symmetrically with respect to the ultrasonic converters in order to suppress W-shaped signal patterns in particular.

The deflection device may be configured on a macroscopic scale. This means that at its greatest elevation and/or depression in relation to the measuring tube surface, the deflection device may protrude into and/or from the measuring tube by an amount that is greater than the wavelength of the ultrasonic signals, i.e., for example greater than 0.1 mm, in particular greater than 0.5 mm, which may be greater than 1.0 mm, particularly may be greater than 2.0 mm or even greater than 4.0 mm. Alternatively or additionally, however, the deflection device may include one or multiple structures on a scale that is smaller than the mentioned macroscopic scale. Thus, the deflection device may include roughnesses instead of or may be in addition to macroscopic structures.

Thus, a distinction may basically be made between two size scales, namely, between structures of the deflection device on a size scale in the macroscopic range according to the above definition, which are also referred to below as coarse structures, and structures on the above-described scale which are in the microscopic range, i.e., for example for elevations less than 1.0 mm, in particular on a size scale of surface roughnesses. These types of structures are also referred to below as fine structures.

Thus, the deflection device may have coarse structures. These coarse structures may relate, for example, to a size scale which extends all the way down to the ultrasonic wavelength in the fluid medium. At a speed of sound of 340 m/s in air at room temperature and a frequency of 340 kHz, this results, for example, in an ultrasonic wavelength of 1 mm.

The deflection device may in particular include at least one deflection surface, which may be at least two or more deflection surfaces. A deflection surface is understood to mean a surface which has at least partially reflective and/or absorptive properties for ultrasonic signals and which is set up to ensure the deflection of ultrasonic waves, corresponding to the function of the deflection device. An even greater number of deflection surfaces is possible, for example four deflection surfaces, which result, for example, for a prism- or pyramid-shaped configuration of the deflection device. The deflection devices may have a flat or also a curved configuration. Various examples are described in greater detail below.

The at least one deflection surface may in particular be inclined with respect to the reflection surface. Alternatively or additionally, the at least one deflection surface may include in particular at least one deflection surface which is inclined with respect to a connecting line between the ultrasonic converters. The at least one deflection surface may be configured in such a way that a base line of this deflection surface, in which the deflection surface intersects a plane defined by the flow direction of the fluid medium and the connecting line between the ultrasonic converters, is situated at an angle, different from 90°, with respect to the connecting line between the ultrasonic converters, for example at an angle of 0° to 70°, and/or at an angle of 110° to 180°. Alternatively or additionally, the at least one deflection surface may have a normal vector which is not parallel or antiparallel to the plane, perpendicular to the reflection surface, which includes the connecting line between the ultrasonic converters. It may thus be ensured, for example, that ultrasonic signals are reflected from a plane, perpendicular to the reflection surface, which includes the connecting line between the ultrasonic converters.

Alternatively or additionally, the surface normals of the deflection surfaces may enclose an angle, in particular also with a surface normal of the reflection surface, which on average has an absolute value greater than 10°, which may be greater than 15°, particularly may be greater than 20°, than the absolute value of this angle. The deflection device may in particular be partially formed by a measuring tube surface between the ultrasonic converters. For example, the measuring tube surface between the ultrasonic converters may be dividable into three surface regions in the direction of a connecting line between the ultrasonic converters. An extension of the three surface regions longitudinally and transversely with respect to the connecting line may in each case be approximately one-third of the length of the connecting line. The absolute value of an angle, averaged over the middle region of these three surface regions, between a surface normal of the reflection surface and the surface normal of the measuring tube surface may be selected to be greater than 10°, in particular greater than 15°, and particularly may be greater than 20°.

The deflection device may in particular have at least one shape which is selected from one of the following shapes: a roof shape; a pyramidal shape; a roof shape having curved roof surfaces as deflection surfaces; a pyramidal shape having curved pyramidal surfaces as deflection surfaces; a pyramidal shape having convex or concave cylindrical surfaces as deflection surfaces; a peak which protrudes into the flow; a sawtooth shape; an undulating shape; a knob shape; a dimpled shape; a humped shape; a stepped shape; a ribbed shape; a shape that is the inverse of at least one of the previously mentioned shapes, which would result, for example, from a negative image of these shapes. Combinations of the mentioned shapes and/or of other shapes may also be provided. In addition, multiple such shapes may be aligned in a row or combined. Thus, for example, multiple pyramidal shapes may be aligned in a row to form a waffle pattern, for example. When multiple pyramidal shapes are aligned in a row in one or two directions, it particularly may be that the base lines of these pyramids extend at an angle, different from 0° and 90°, with respect to a connecting line between the ultrasonic converters. For example, the base lines may extend at an angle of 20° to 70° and/or at an angle of 110° to 160° with respect to the connecting line.

However, other configurations are also possible in principle. The mentioned shapes may in particular be configured as a coarse structure within the meaning of the above definition. Alternatively or additionally, however, one or more of the mentioned shapes may be configured as a fine structure, for example on a deflection surface. Thus, for example, coarse structures and fine structures may also be combined with one another, for example in that one or multiple surfaces of a coarse structure, for example one or multiple deflection surfaces, are substructured by one or multiple fine structures.

Thus, as described above, the deflection device may in particular have at least one, which may be at least two or more, deflection surfaces. These deflection surfaces may in particular have a substructuring and/or a fine structure. A fine structure is understood to mean a structuring on the above-described size scale, for example a substructuring of the at least one deflection surface. The deflection surface as such may define a coarse structure over its entirety, or may be a component of a coarse structure, in which case the at least one deflection surface may be divided into multiple partial surfaces by the fine structure or by another type of substructuring, for example at least one fairly small coarse structure.

This substructuring, for example the fine structure or the fairly small coarse structure, may in particular have a depth in the range of less than 5 wavelengths of the ultrasonic waves in the fluid medium, which may be in the range of less than 2 wavelengths, and particularly may be less than one wavelength, for example in the range of one-fourth wavelength. The substructuring may in particular have one or more of the following structures: multiple ribs; multiple grooves; a grid; a substructuring having multiple surfaces; a substructuring having multiple shapes of the above-mentioned type.

As described above, in addition to the longitudinal offset with respect to the flow direction, the ultrasonic converters may also be offset relative to one another transversely with respect to the flow of the fluid medium. It is thus possible, for example, to prevent flow irregularities, produced by an ultrasonic converter situated upstream, from influencing an ultrasonic converter situated downstream.

In addition, the deflection device may include at least one reflection barrier, in particular in a configuration having ultrasonic converters which are offset relative to one another transversely with respect to the flow of the fluid medium, but also in other configurations. A reflection barrier is understood to mean a barrier which extends from the measuring tube surface into the flow of the fluid medium at a comparatively steep angle. For example, this reflection barrier may be configured in the form of a lamella. For example, the reflection barrier may intersect a connecting line between the ultrasonic converters in the middle third, which may be at the midpoint.

In particular, the reflection barrier may be configured in such a way that it includes a lamella having the following properties: First of all, the lamella has a main direction of extension having a nonvanishing vector component transverse to the direct connecting line between the ultrasonic converters, so that sound waves from one ultrasonic converter, via a first reflection on the reflection surface, do not reach the other converter to a greater degree via one or multiple reflections on the deflection device and a second reflection on the reflection surface, but instead are back-reflected or tend to be reflected away laterally. Alternatively or additionally, due to the configuration of the ultrasonic converter transversely offset to the flow direction, the lamella may be situated parallel or essentially parallel to the flow direction, so that the lamella does not disturb the course of the flow. As a result of this configuration of a main structure of the deflection device in the flow direction, the appropriate structural depth may be selected to be correspondingly greater without disturbing the course of the flow, so that a proper barrier for the W-shaped sound pattern may be implemented.

As described above, the deflection device may in particular include at least two deflection surfaces. These deflection surfaces, as described above, may intersect in a roof shape in an intersection line. The intersection line may be situated in particular at an angle, different from 90°, with respect to a connecting line between the ultrasonic converters, so that not only are otherwise W-shaped sound patterns reduced or eliminated by the roof inclination of the deflection surfaces, but also the sound is reflected from the plane which extends perpendicularly to the reflection surface and parallel to the connecting line between the ultrasonic converters. This plane is generally identical to the plane which is defined by the main components of the useful signals, or also by the W-shaped components in the absence of a deflection device. The angle, which is different from 90°, between the intersection line of the deflection surfaces and the connecting line between the ultrasonic converters is considered to be equivalent to the characteristic that the normal vectors of the deflection surfaces are not parallel to the plane defined by the main components of the useful signals.

An appropriate deflection of the sound components, occurring on the deflection surface, from this plane prevents these deflected sound components from being back-reflected to an excessive degree via the reflection surface to the transmitting ultrasonic converter, which is likewise regarded as a parasitic sound path (for the opposite measuring direction, for example). For example, an angle of less than 80°, for example an angle of less than 70°, may be provided. The deflection surfaces themselves may meet, for example, at an angle that is different from 90°, for example at an angle that is greater than 90°, for example an angle greater than 100° and in particular an angle greater than 110°. However, other embodiments are also possible.

The proposed ultrasonic flow sensor has several advantages over known ultrasonic flow sensors. Thus, in particular an unambiguous ultrasonic transmission path may be ensured with extensive suppression of parasitic ultrasonic paths. As described above, the ultrasonic flow sensor may be configured in particular with two ultrasonic converters which are offset in the flow to be measured and which exchange ultrasonic signals via the reflection surface. The orientation of the reflection surface may be specified in particular by its main normal vector $N_h$ in the reflection region. As described above, the measuring tube surface may be divided into the three surface regions, defined above, between the ultrasonic converters in the direction of the connecting line between the ultrasonic converters, and the extensions of these surface regions longitudinally and transversely with respect to this connecting line are at least approximately one-third of length L of the connecting line.

For example, as described above, the angle, averaged over the middle region of these three surface regions M, between surface normal N of the measuring tube surface and the vector directed antiparallel to main normal vector $N_h$ of the reflection surface may be selected to be greater than 15°. The ultrasonic flow sensor, in particular as a deflection device between the ultrasonic converters, may have a surface structure, in particular a surface structure of a measuring tube surface. This surface structure may in particular be configured in such a way that a parasitic W-shaped sound path, having reflections via the reflection surface, via the region between the ultrasonic converters, and once again via the reflection surface, may be essentially suppressed by the surface structure, compared to the V-shaped, desired useful sound path which passes only once via the reflection surface.

Interference signals in particular are suppressed via the exemplary embodiments and/or exemplary methods of the present invention. Without the exemplary embodiments and/or exemplary methods of the present invention, these interference signals would reach the receiver at a later time than the useful signals, for example with approximately twice the propagation time. Thus, these interference signals could be awaited, or eliminated by a suitably selected evaluation time window. However, it would then be necessary to wait for a longer time in repetitive measuring mode until a new measurement could take place, or until the measurement could take place in the opposite sound direction.

In contrast, as a result of the exemplary embodiments and/or exemplary methods of the present invention the measurement repetition rate may be brought into a range, without additional measuring errors, that is necessary for sufficient sampling of pulsing flows, for example in the intake, fresh air, or exhaust gas region of internal combustion engines. Compared to the device of DE 39 41 544 A1, the advantage lies in particular in the primary V-shaped sound path, which requires only a single reflection.

Exemplary embodiments of the present invention are illustrated in the drawings and explained in greater detail in the following description.

BRIEF DESCRIPTION OF THE DRAWINGS

FIGS. 6A through 7 show a first exemplary embodiment of an ultrasonic flow sensor according to the present invention, having a deflection device.

FIGS. 8 through 16 show alternative exemplary embodiments of an ultrasonic flow sensor according to the present invention.

FIGS. 17 through 19F show various exemplary embodiments of surface contouring of a deflection device.

FIGS. 20A through 22B show further exemplary embodiments of ultrasonic flow sensors according to the present invention.

DETAILED DESCRIPTION

Figure 1:
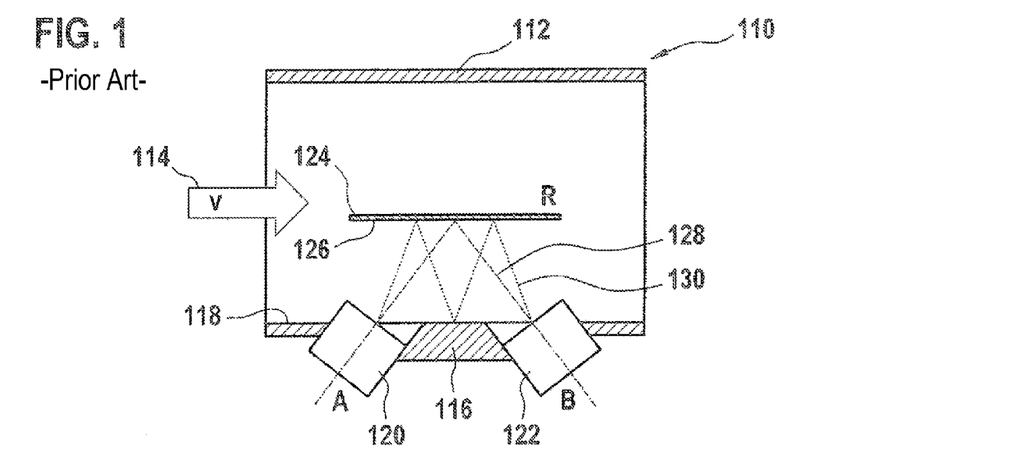
FIG. 1 shows a basic configuration of a known ultrasonic flow sensor having a simple reflection surface.

FIG. 1 shows a known ultrasonic flow sensor 110 as the starting point for the present patent application. This ultrasonic flow sensor has a flow tube 112, through which a fluid medium, for example an exhaust gas of an internal combustion engine and/or an air mass in an intake system of an internal combustion engine (for example, also after compression by a turbocharger), flows in a flow direction 114 at a velocity denoted by reference character v in FIG. 1. Flow tube 112 has a measuring tube 116 which, for example, may form a section of flow tube 112, or which may also be formed by a housing, and which is mounted as a plug-in sensor in flow tube 112. Two ultrasonic converters 120, 122 are offset relative to one another, longitudinally with respect to flow direction 114, in a measuring tube surface 118 of measuring tube 116.

These ultrasonic converters 120, 122 are also denoted by letters A and B in FIG. 1. Ultrasonic converters 120, 122 exchange ultrasonic waves via a reflector 124 having a reflection surface 126. This results in a V-shaped desired sound path 128, which is illustrated by a dashed-dotted line in FIG. 1. FIG. 1 also shows a parasitic W-shaped sound path 130, illustrated by a dotted line, which results from multiple reflections on reflection surface 126, with a reflection in-between on measuring tube surface 118. Average flow rate V, and based on same, the volume flow and/or the mass flow, are ascertained via the propagation times of the sound waves from A to B and vice versa. Depending on the directional characteristic of ultrasonic converters 120, 122 and depending on the beam drift due to the flowing medium, one or multiple undesirable sound paths, for example illustrated W-shaped or M-shaped parasitic sound path 130, result(s) in addition to desired V-shaped sound path 128.

Figure 2A:
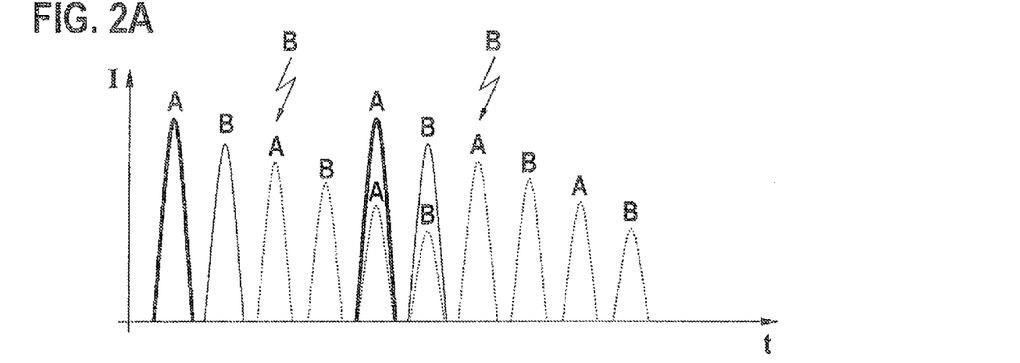
FIGS. 2A and 2B show the variation over time of ultrasonic signals at the ultrasonic converters.
Figure 2B:
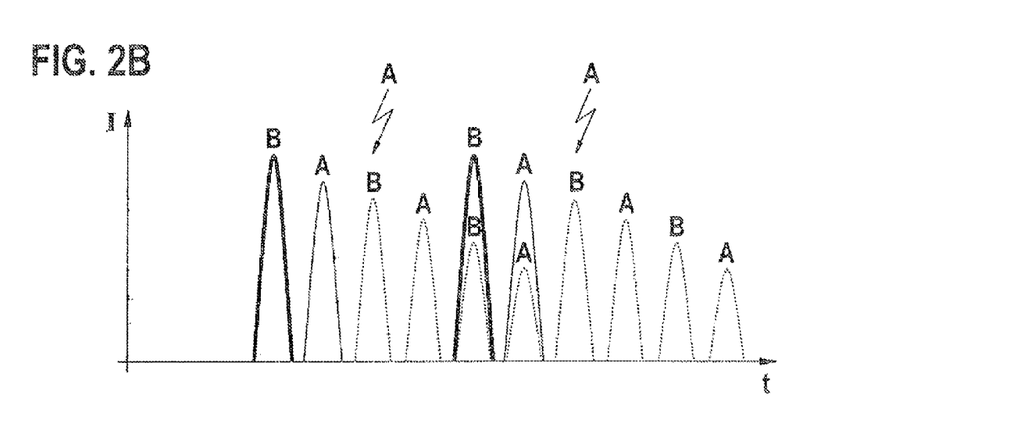

FIGS. 2A and 2B show one possible time sequence of the ultrasonic measurements. These figures in each case illustrate sound intensity I at both ultrasonic converters 120, 122 as a function of time t, subdivided into the sound waves emitted at ultrasonic converter A (FIG. 2A) and the sound waves emitted at ultrasonic converter B (FIG. 2B). The sound is initially transmitted to ultrasonic converter A (FIG. 2A, curve in boldface), and the sound is then transmitted via V-shaped sound path 128 to B (thin curve in FIG. 2A). Normally, the sound received at B is not completely converted into an electrical signal, but, rather, a large portion of the sound energy is reflected back at the receiving ultrasonic converter and then arrives at A once again (dotted line), where it is once again reflected and reaches B again, etc.

When the sound is transmitted to B (FIG. 2B, curve in boldface), while the sound which is transmitted from A and reflected at B returns back to A, the sound which is transmitted to B arrives at A, where no reflected, ambient noise from the last transmission process (A) is present, but instead, only sound from the next to last transmission process (B) is present. At this point in time, the corresponding ambient noise has already been reflected four times at ultrasonic converters 120, 122 and correspondingly attenuated. In addition, as a result of a variable measurement repetition rate, the influence of this ambient noise which has been reflected four times may be further reduced by averaging over multiple measurements which have been carried out in slightly different time intervals, for example within the variation range of an ultrasonic period. The measurement repetition rate, as shown in FIGS. 2A and 2B, may thus be selected to be relatively high, so that for an individual measurement it is not necessary to wait until all echoes originating from prior transmission events have died down.

Figure 3:
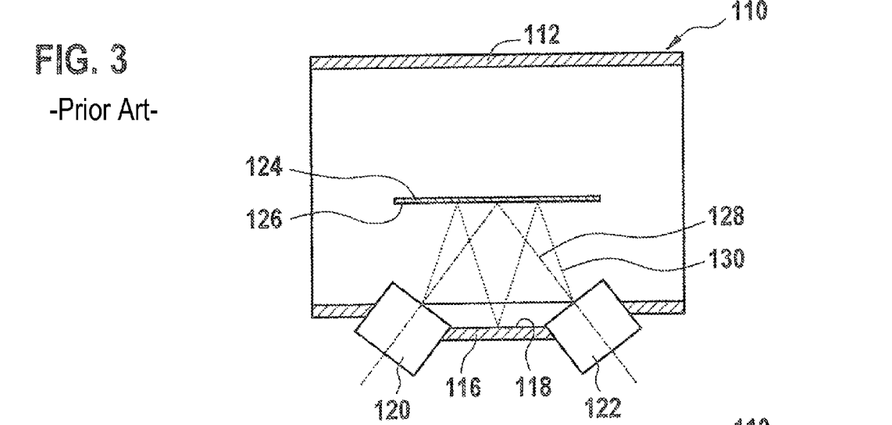
FIGS. 3 through 5 show alternatives to FIG. 1 for configurations with or without insufficient suppression of parasitic ultrasonic paths.
Figure 4:
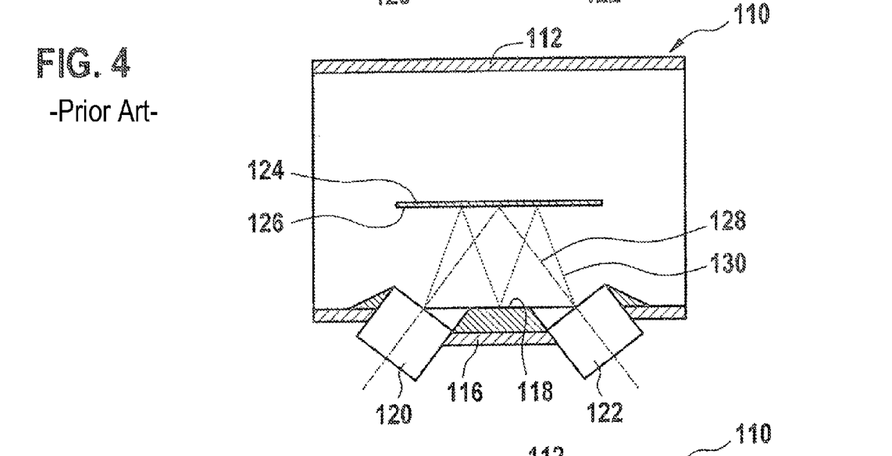
Figure 5:
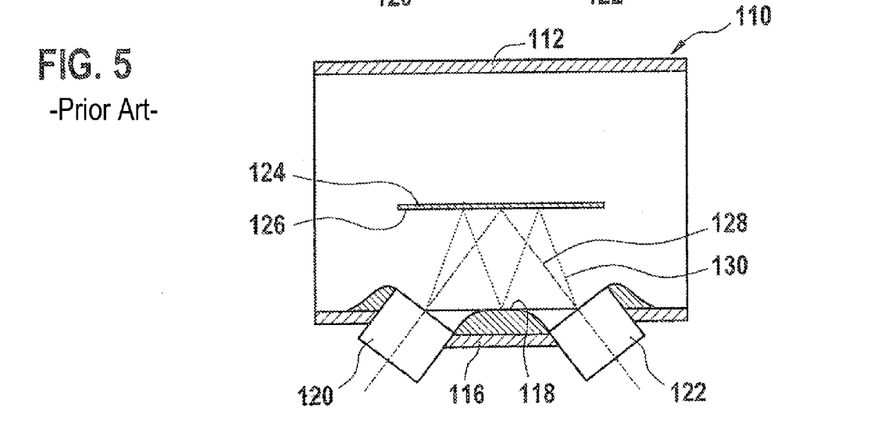
Figure 6A:
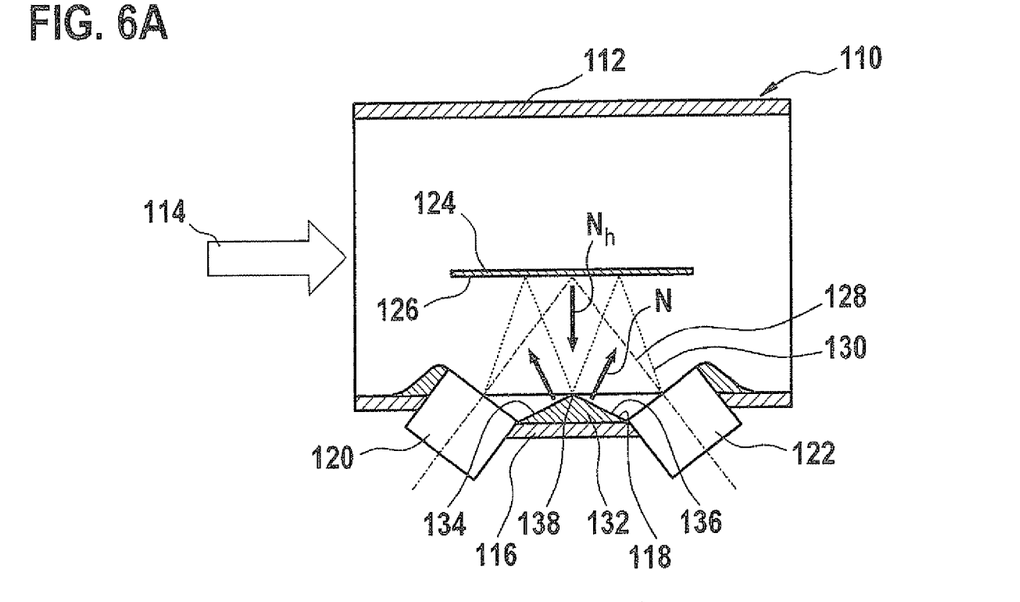
Figure 6B:
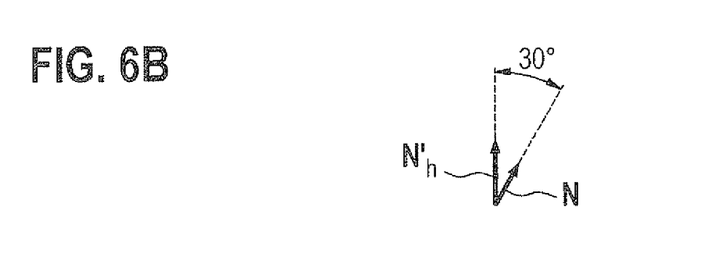
Figure 6C:
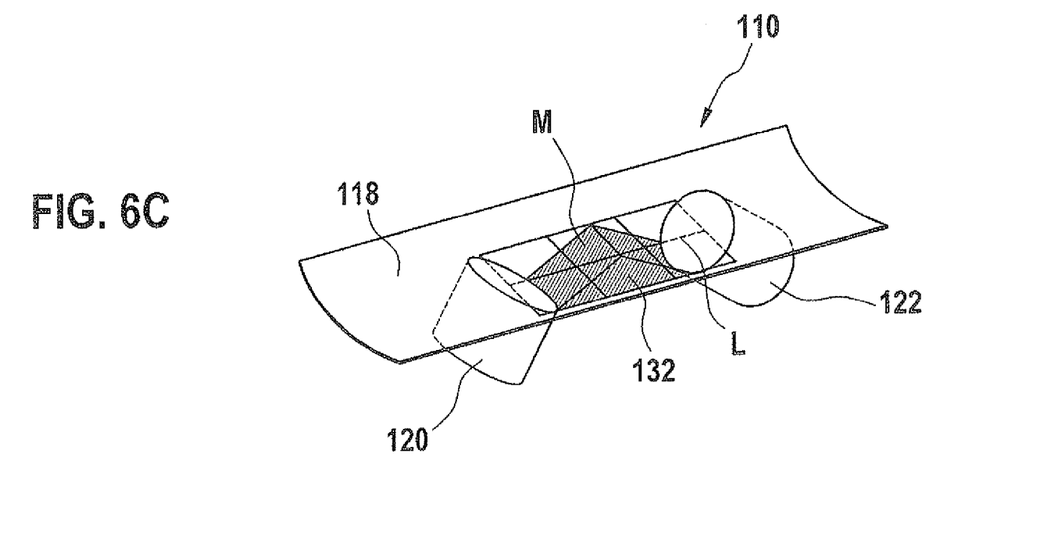
Figure 7:
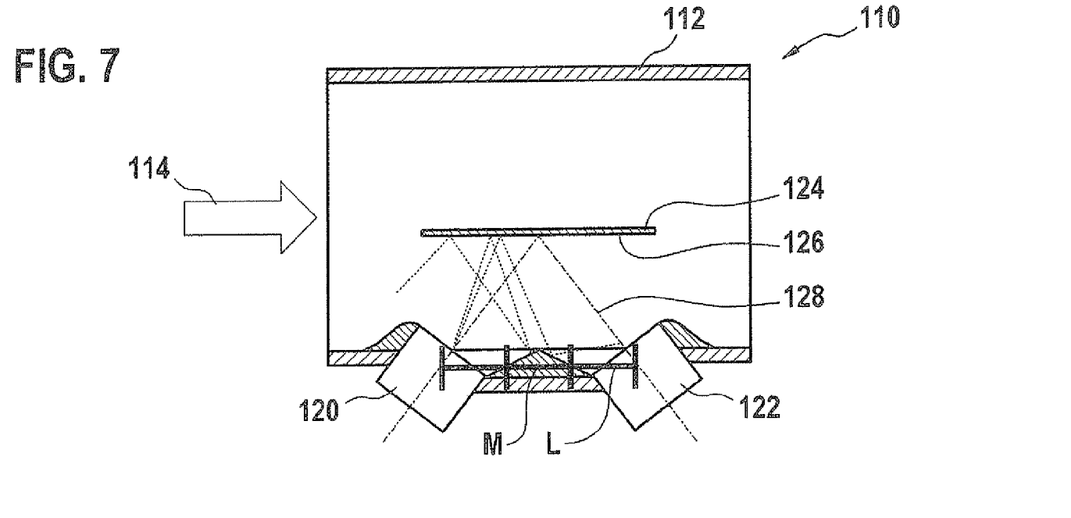

However, parasitic W- or M-shaped sound paths or other parasitic sound paths have not yet been taken into account in the illustration in FIGS. 2A and 2B. These paths are, for example, approximately twice as long as V-shaped sound path 128, so that during continuously repeated measurements in a short time interval, as in FIGS. 2A and 2B, additional interference signals result which cause a measuring error. These parasitic sound paths result primarily when a reflective surface, for example a reflective measuring tube surface 118, is present between ultrasonic converters 120, 122. Unlike in FIG. 1, this may also occur with other geometries, as illustrated in FIGS. 3 through 5, for example. These figures once again show ultrasonic flow sensor 110, similar to the starting point of the present invention shown in FIG. 1, so that for the most part reference may be made to the above description.

The shown geometries share the common characteristic that surface components are present, in particular approximately in the middle between ultrasonic converters 120, 122, which have a normal direction that is approximately antiparallel to the main normal vector of reflection surface 126. FIG. 5 shows one embodiment in which a curvature is present between ultrasonic converters 120, 122, which may also offer aerodynamic advantages, for example, and at the same time slightly scatters sound. However, a normal vector which is antiparallel to the normal vector of reflection surface 126 is still present, in particular in the critical region approximately in the middle between ultrasonic converters 120, 122, among other regions. This is generally the case even when measuring tube surface 118 has a continuous slight curve or curvature between ultrasonic converters 120, 122.

FIGS. 6A through 8, on the other hand, illustrate a first specific embodiment of an ultrasonic flow sensor 110 according to the present invention. In the present case, the ribs are denoted by reference numeral 140. This subdivision of deflection surfaces 134, 136 by the ribbed structure of ribs 140, which may extend to the base of flow tube 112 or also may be only partially embedded in deflection surfaces 134, 136, may, for example, promote the aerodynamic properties of ultrasonic flow sensor 110 and also cause additional sound scattering or partial sound obliteration due to interference of the sound waves which are scattered or reflected at individual ribs 140.

Figure 9A:
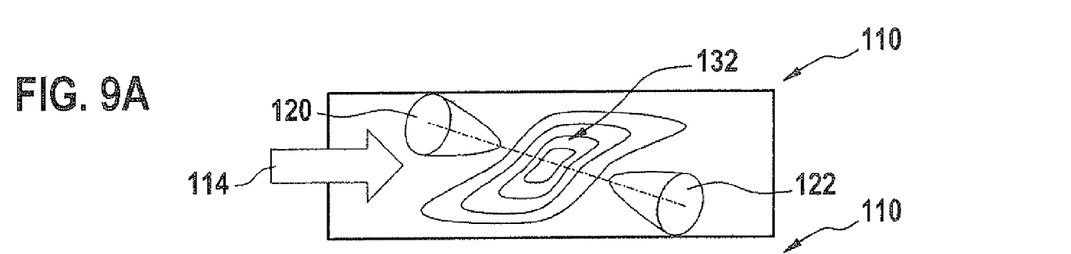
Figure 9B:
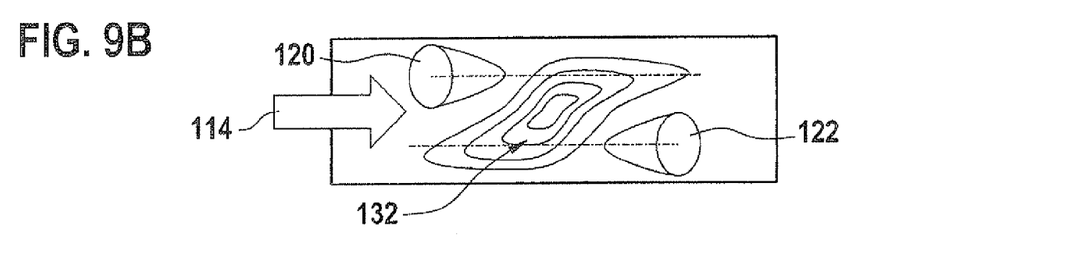

Alternative specific embodiments of the contour between ultrasonic converters 120, 122 in the form of contour lines are symbolically illustrated in FIGS. 9A and 9B. It is shown that ultrasonic converters 120, 122 may also be offset relative to one another, laterally transversely with respect to flow direction 114. The outlying edges of the contour of deflection device 132 may extend, at least partially, laterally adjacent to ultrasonic converters 120, 122. Ultrasonic converters 120, 122 may also be offset next to one another, transversely with respect to flow direction 114 (FIG. 9A), and/or may be shifted or tilted relative to one another with regard to their mutual direct orientation (FIG. 9B). As a result of these embodiments, on the one hand it may be ensured that echoes reflected multiple times between ultrasonic converters 120, 122 are reduced, and on the other hand that a vortex trail of the one ultrasonic converter 120 does not meet the other ultrasonic converter 122.

Figure 10A:
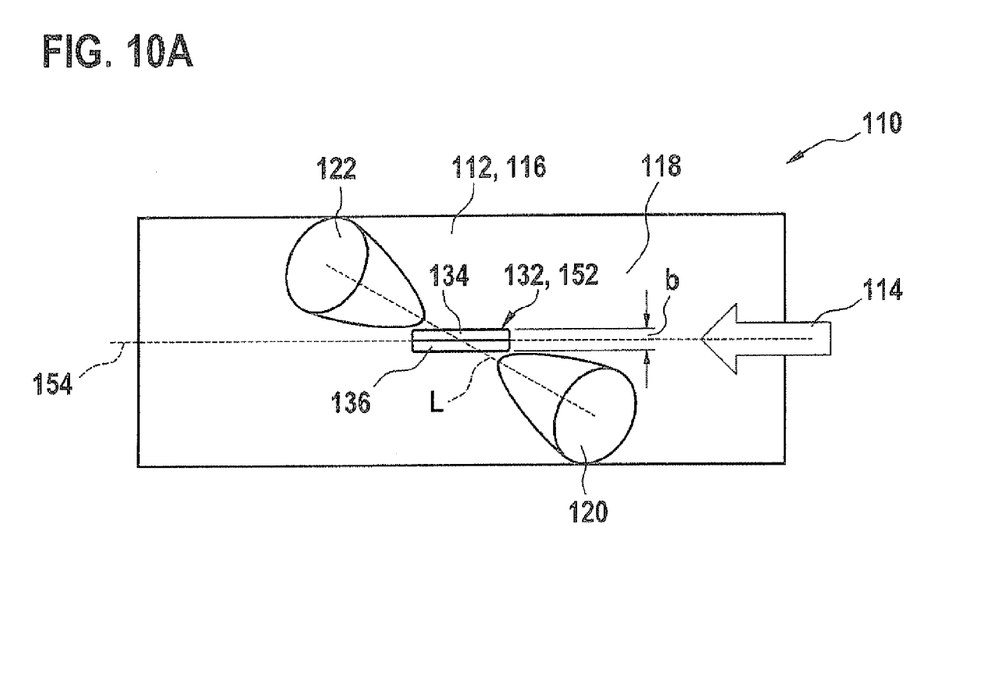
Figure 10B:
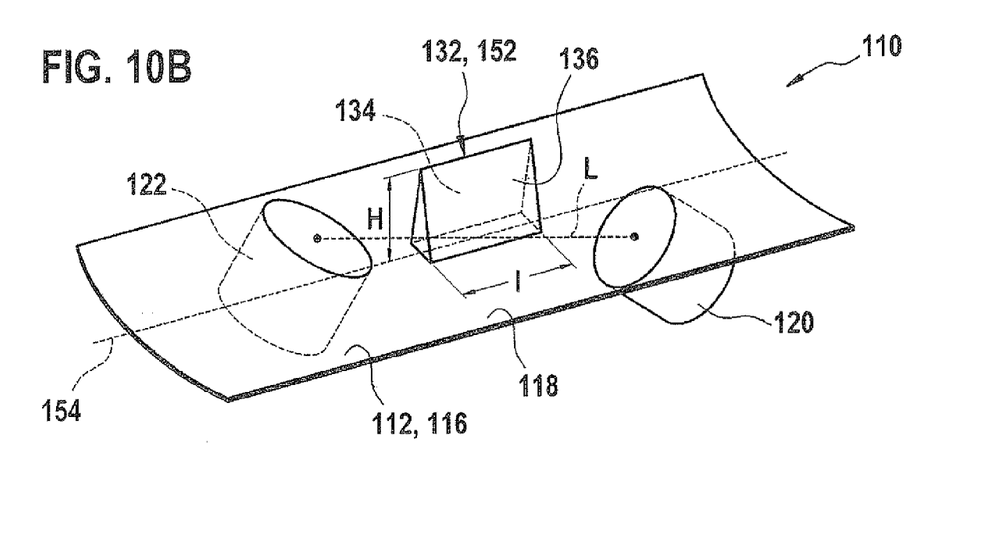

FIGS. 10A and 10B show another exemplary embodiment of an ultrasonic flow sensor 110 in which deflection device 132 includes at least one reflection barrier 152. FIG. 10A shows a top view of measuring tube surface 118 in which ultrasonic converters 120, 122 are accommodated, while FIG. 10B shows a perspective partial view of the system.

It is apparent from these illustrations that reflection barrier 152 is basically a structure which protrudes from measuring tube surface 118 and which includes at least two deflection surfaces 134, 136 which extend at a very steep angle with respect to measuring tube surface 118. For example, these deflection surfaces 134, 136 may extend at an angle of 70° to 110°, in particular 80° to 90°, with respect to measuring tube surface 118. Reflection barrier 152 may extend at a height H between 1.0 mm and 20 mm, for example, into the flow of the fluid medium. In addition, reflection barrier 152 may have, for example, a length I in flow direction 114 which may be 1.0 mm to 50 mm, for example.

Furthermore, reflection barrier 152 may in particular be situated essentially parallel to flow direction 114, as is apparent in particular from the illustrated example in FIG. 10A. The term "essentially parallel" may also be understood to mean a deviation from parallelism by no more than 20°, which may be by no more than 10°, and particularly may be by no more than 5°. Reflection barrier 152 may have a very narrow configuration overall, for example having a width b perpendicular to flow direction 114 which is no greater than 5.0 mm, for example 0.5 mm to 3.0 mm.

As is likewise apparent from FIGS. 10A and 10B, reflection barrier 152 may in particular extend at an angle with respect to the connecting line between ultrasonic converters 120, 122, which is denoted by reference character L in FIGS. 10A and 10B. For example, the direction of longitudinal extension of the reflection barrier, which is denoted by reference numeral 154 in FIGS. 10A and 10B, may intersect connecting line L at an angle of 5° to 60°, in particular 20° to 45°.

Figure 8:
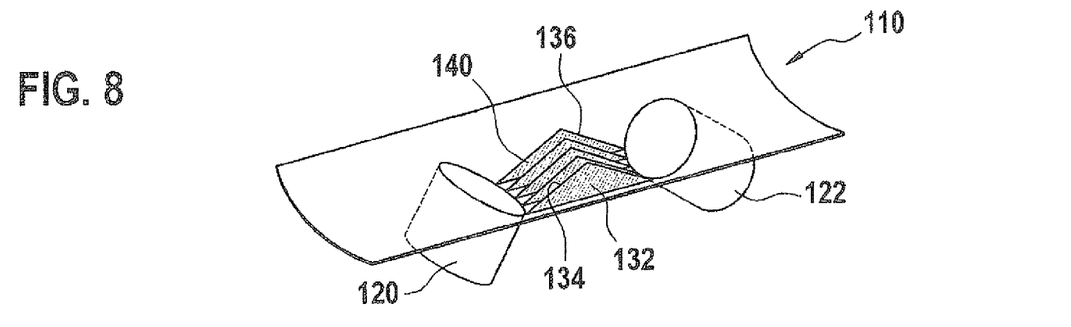

If a roof-like structure having ribs 140, for example lamellae, as in FIG. 8, or also a configuration without lamellae, is selected, this "roof" of deflection device 132 may also be additionally tilted in such a way that intersection line 138 between deflection surfaces 134, 136, which may be configured as a "ridge line" of this roof, is not perpendicular to connecting line L between ultrasonic converters 120, 122. This configuration may also be implemented in the remaining exemplary embodiments of the present invention, for example in the exemplary embodiments according to FIGS. 11 through 14. Thus, FIG. 11 describes a configuration similar to the exemplary embodiment in FIG. 9B, it being possible for deflection surfaces 134, 136 to also have a substructuring 142, for example in the form of ribs or grooves, for example in the form of a fairly small coarse structure or in the form of a fine structure.

Figure 11:
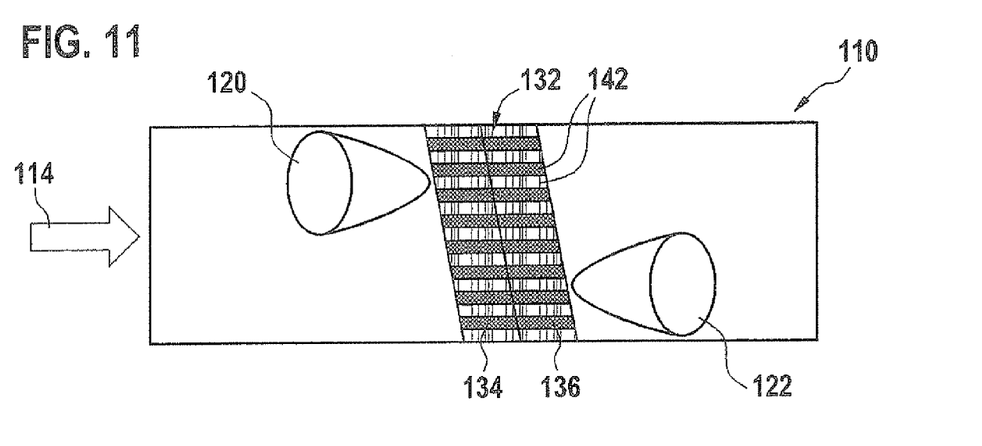
Figure 12:
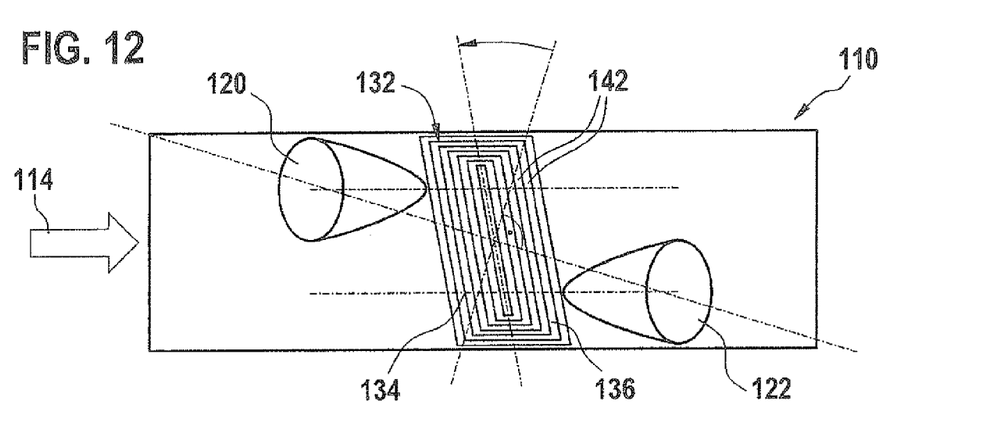
Figure 13:
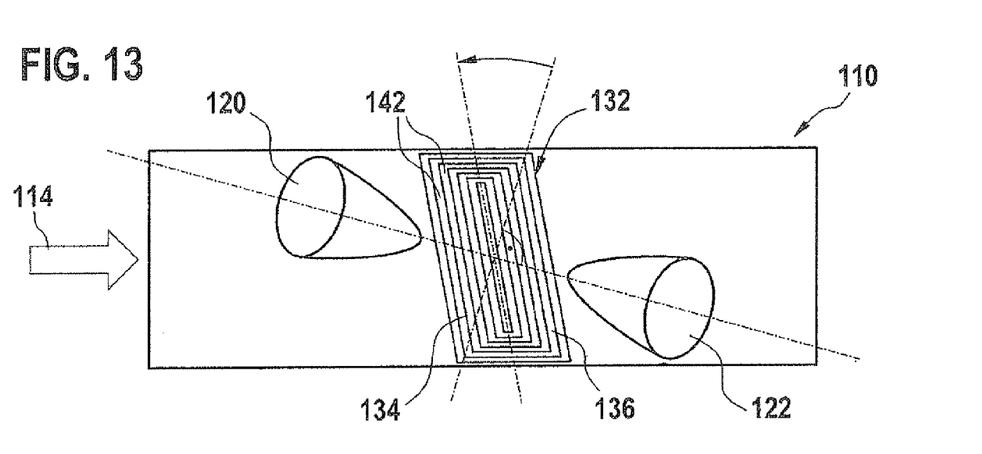
Figure 14:
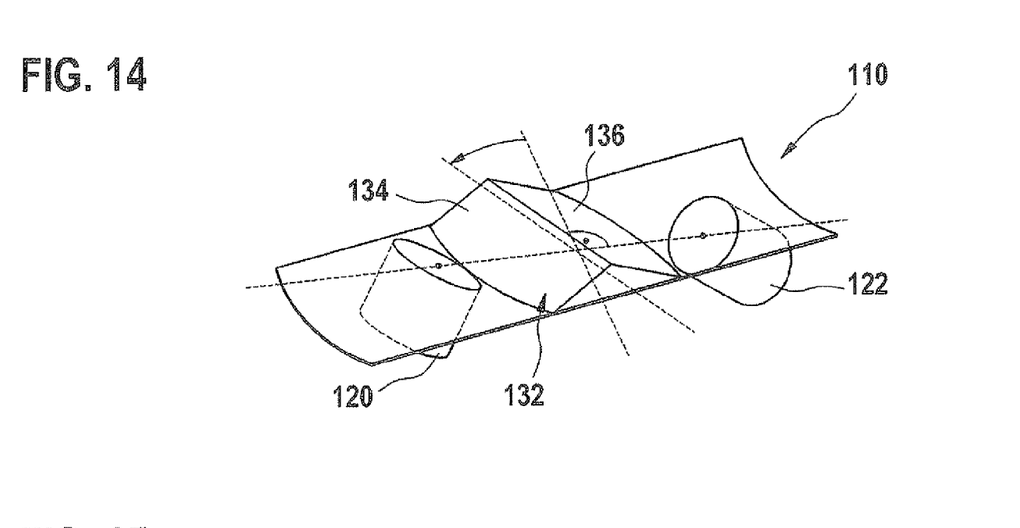

FIG. 12 shows a modification of the exemplary embodiment in FIG. 11 in which a substructuring 142 is likewise provided, for example in the form of steps. FIG. 13 shows an exemplary embodiment that is similar to the exemplary embodiment in FIG. 9A, in which once again substructuring 142 is likewise optionally provided, in this case once again in the form of steps, for example. A substructuring 142, for example in the form of a coarse structure on a smaller scale or a fine structure, may generally be optionally provided in deflection surfaces 134, 136 for all exemplary embodiments of the present invention. This type of substructuring 142 subdivides the coarse structure, which is specified by deflection surfaces 134, 136, into smaller surfaces, for example subsurfaces, depressions, grooves, or the like. The depth of this substructuring 142 may be in the range of the ultrasonic wavelength in the fluid medium, for example in which the depth of substructuring 142 does not exceed five times, which may be three times or even two times, this wavelength.

Figure 15:
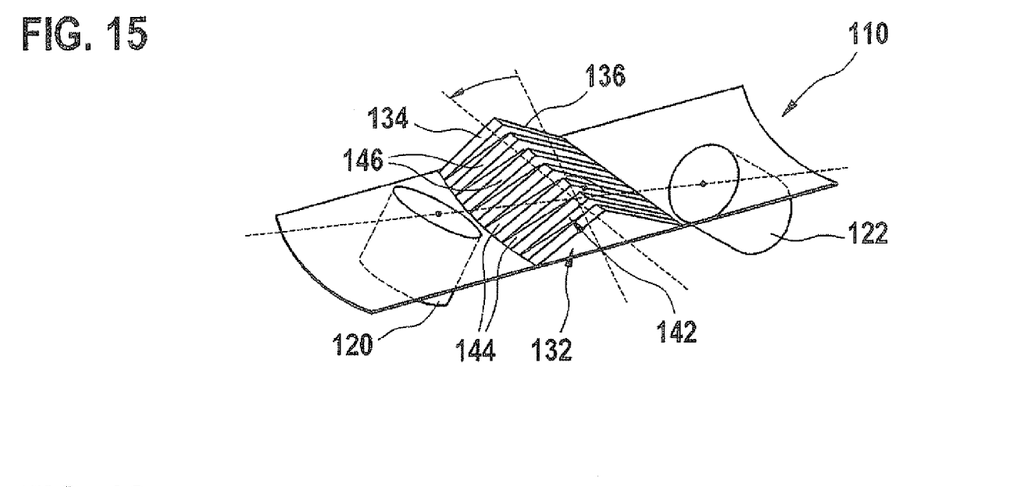
Figure 16:
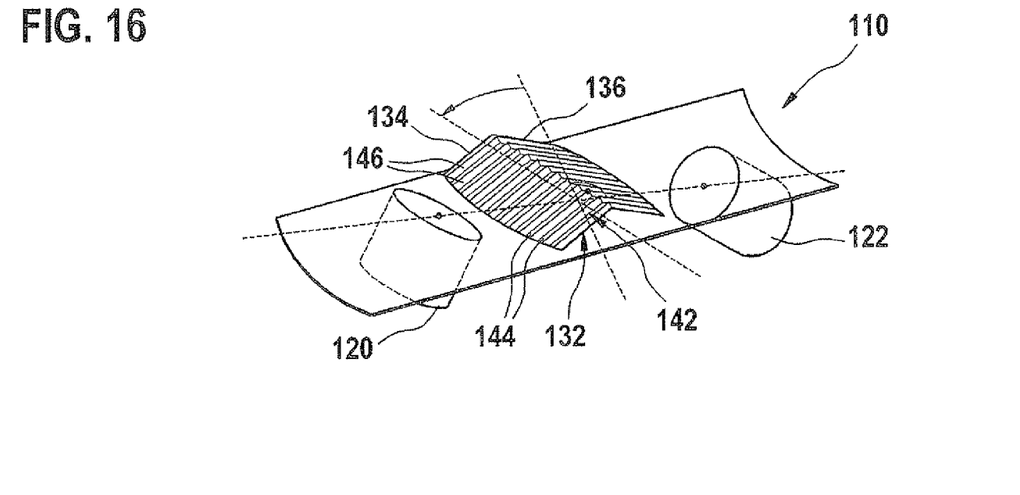

FIG. 14 once again shows a basic structure of the roof-like configuration of deflection device 132. As described above, the coarse structure between ultrasonic converters 120, 122, specified by deflection surfaces 134, 136 of this deflection device 132, additionally has grooves 144 as surface substructuring 142, as illustrated as an example in the exemplary embodiment according to FIG. 15. These grooves 144 may define surface sections 146, for example surface sections 146 on the webs between grooves 144, and surface sections 146 between these webs. Adjacent surface sections 146 may meet one another perpendicularly, as is the case, at least approximately, in the exemplary embodiment according to FIG. 15, for example, or also at an angle, as shown in the exemplary embodiment according to FIG. 16. Surface sections which meet one another at an angle improve the scattering effect with regard to the parasitic sound. This is illustrated in simplified form in FIG. 17.

Figure 17:
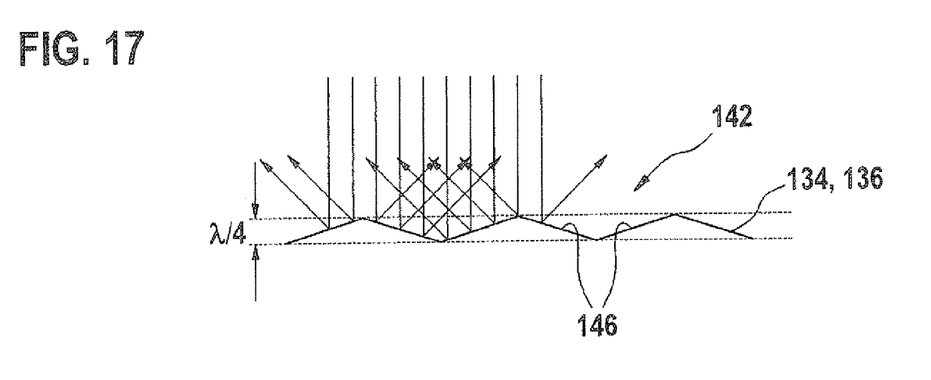
Figure 18:
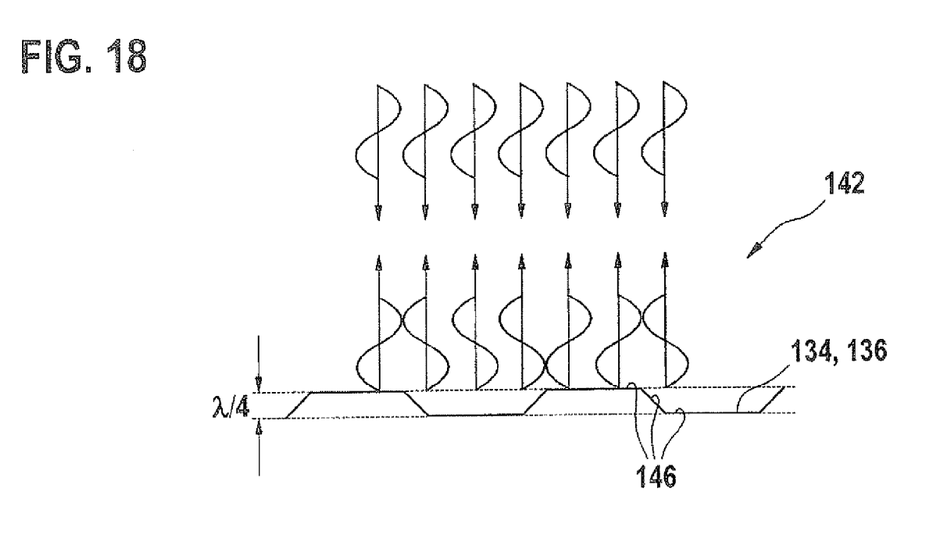
Figure 19A:
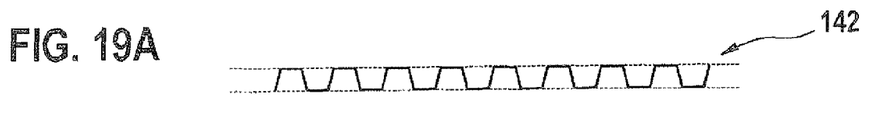
Figure 19B:
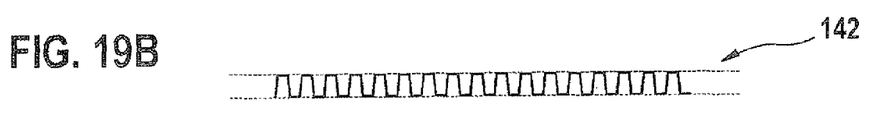
Figure 19C:
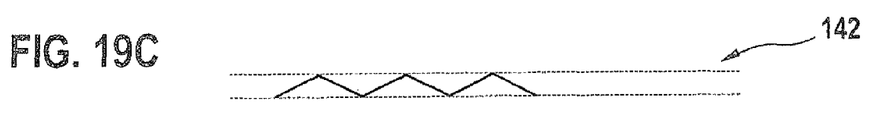
Figure 19D:
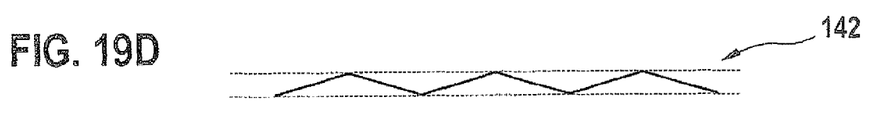
Figure 19E:
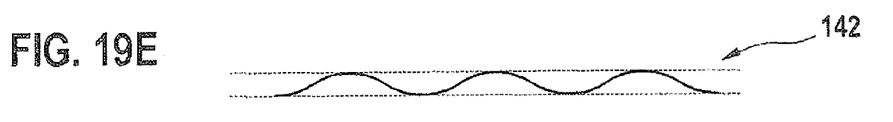
Figure 19F:
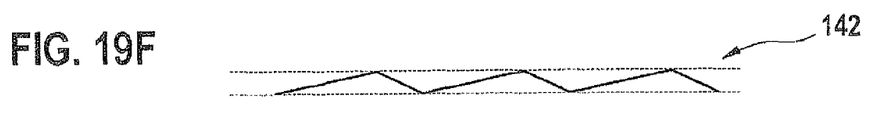

FIG. 17 illustrates a cross section of one of deflection surfaces 134, 136, in which these surface sections 146 are apparent. In particular, substructurings 142 which have depth dimensions and/or lateral dimensions in the range of the sound wavelength in the flowing medium, for example in the range of $\lambda/4$, are advantageous. This is illustrated once again with reference to FIG. 18, which shows a configuration of surface sections 146 as an alternative to FIG. 17. This type of dimensioning results in phase shifts of the reflected sound components, which obliterate themselves at least partially by interference. FIGS. 19A through 19F show various further configurations as an alternative to the roof-shaped substructuring shown in FIG. 17, or to the substructuring shown in FIG. 18.

Figure 20A:
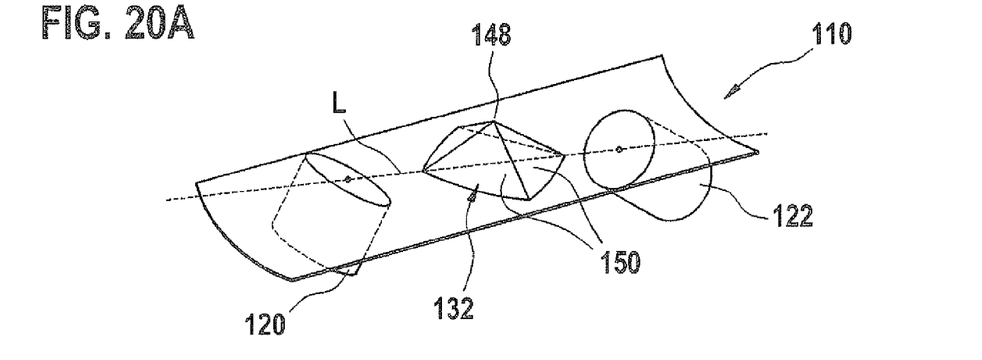
Figure 20B:
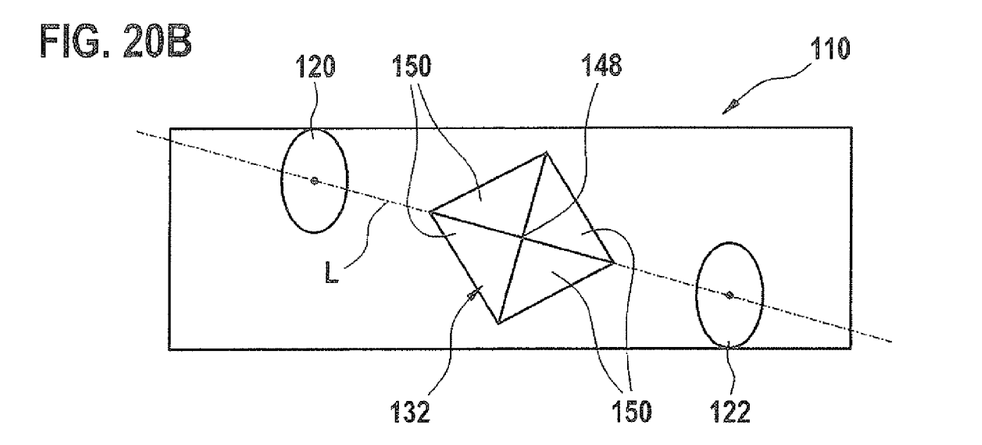

In addition to substructurings 142 having a main orientation, for example grooved structures as previously described, substructurings 142 having multiple main orientation axes, or structures which are distributed approximately isotropically in the surface, for example grid-like structures, or elevations and/or depressions having an apparently disordered configuration, are conceivable. Regardless of the selection of such substructuring, FIGS. 20A (perspective illustration) and 20B (top view) illustrate a coarse structure between ultrasonic converters 120, 122 which acts as deflection device 132 and which has a peak 148 instead of a "ridge line."

This peak 148 may be the termination of, for example, a pyramidal structure having three, four, or more deflection surfaces 150. If such a structure as in FIGS. 20A and 20B is oriented with respect to connecting line L between ultrasonic converters 120, 122, W-shaped parasitic sound components are deflected not only in the flow direction or in the direction of connecting line L between ultrasonic converters 120, 122, but also via a component transverse thereto.

Figure 21:
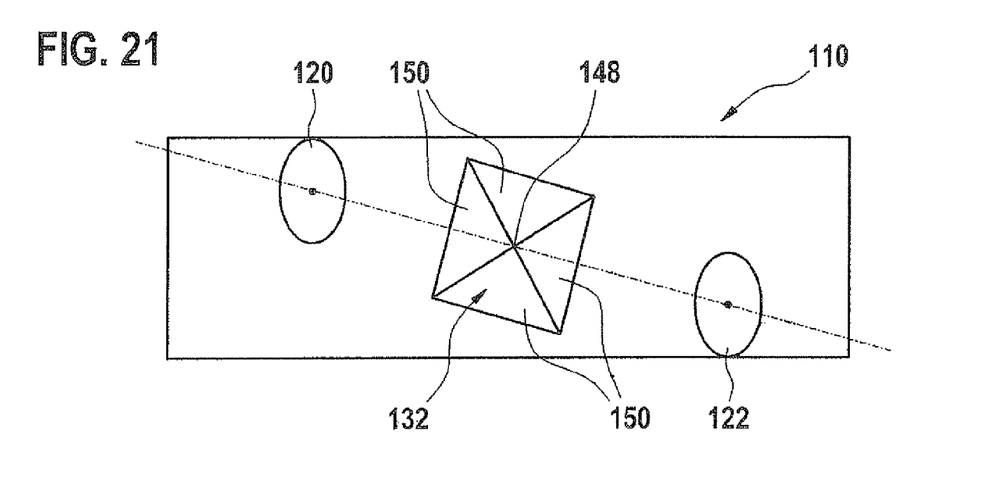
Figure 22A:
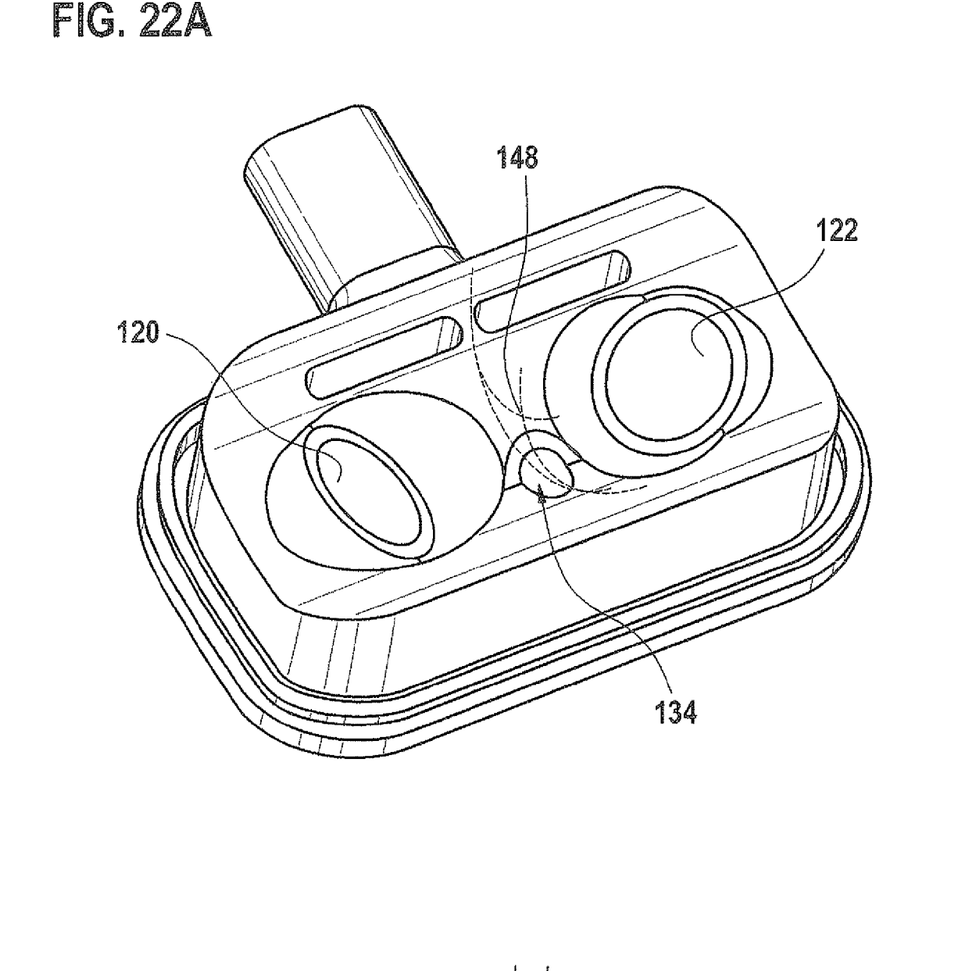
Figure 22B:
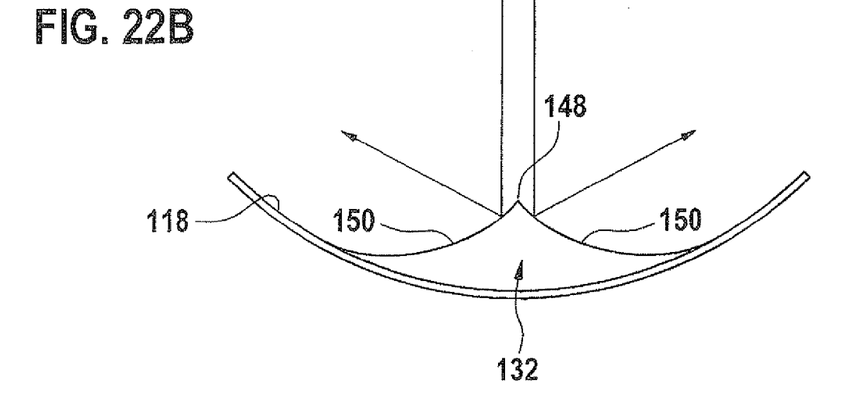

FIG. 21 shows a modification of the system illustrated in FIG. 20B. This modification has the transverse deflection at only two of four deflection surfaces 150 in the form of pyramidal surfaces, but in most applications still shows a sufficient deflection effect. In particular the latter geometry according to FIG. 21 has the additional advantage that it has particularly good compatibility with the installation pockets for ultrasonic converters 120, 122 in measuring tube surface 118, which are usually installed at an angle. In this case, it is appropriate to curve and/or distort the pyramidal structure so that it has an actual pyramidal shape only at peak 148. This is elucidated with reference to the perspective illustration in FIG. 22A; FIG. 22B shows a sectional illustration of measuring tube surface 118 perpendicular to a connecting line L between ultrasonic converters 120, 122. The pyramidal structure of deflection device 132 has been produced by mutually intersecting cylindrical surfaces of measuring tube surface 118.

Alternatively, conical surfaces or also other straight or curved surfaces may be used which mutually intersect and thus form deflection device 132, which may have a peak of 148. Also in the configuration shown in FIG. 22A, each of the four "roof surfaces" which form deflection surfaces 150 has an orientation whose normal direction in and/or against and/or transverse to the flow direction greatly deviates from the vector antiparallel to the normal direction of reflection surface 126, as the result of which parasitic sound contributions may be avoided.

What is claimed is:

1. An ultrasonic flow sensor for use in a fluid medium, comprising:
    at least two ultrasonic converters, which are situated in a flow tube offset relative to one another, longitudinally with respect to a flow of the fluid medium;
    a reflection surface, wherein the at least two ultrasonic converters are set up to exchange ultrasonic signals via simple reflection on the reflection surface; and
    a deflection device disposed between the ultrasonic converters along an axis connecting the ultrasonic converters, wherein the deflection device is set up to suppress at least 30% of parasitic ultrasonic signals, which are reflected from the reflection surface and which strike the deflection device, by deflection away from the ultrasonic converters; and wherein the deflection device has at least one deflection surface having a substructuring oriented to reflect ultrasonic signals, the substructuring having one or more of the following structures: multiple ribs; multiple grooves; a grid; a substructuring having multiple surfaces; a substructuring having multiple ones of the structures.

2. The ultrasonic flow sensor of claim 1, wherein the deflection device is situated at least in a middle third of a connecting distance between the ultrasonic converters.

3. The ultrasonic flow sensor of claim 1, wherein the deflection device has at least one deflection surface.

4. The ultrasonic flow sensor of claim 1, wherein surface normals of the deflection surface enclose an angle with a surface normal of the reflection surface, which on average has an absolute value greater than 10°.

5. The ultrasonic flow sensor of claim 1, wherein the deflection device is at least partially formed by a measuring tube surface between the ultrasonic converters.

6. The ultrasonic flow sensor of claim 1, wherein the measuring tube surface between the ultrasonic converters is dividable into three surface regions in the direction of a connecting line between the ultrasonic converters, an extension of the three surface regions longitudinally and transversely with respect to the connecting line in each case being one-third of the length of the connecting line, the absolute value of an angle, averaged over the middle region of these three surface regions, between a surface normal of the reflection surface and the surface normals of the measuring tube surface being greater than 10°.

7. The ultrasonic flow sensor of claim 1, wherein the deflection device has at least one of the following shapes: a roof shape; a pyramidal shape; a roof shape having curved roof surfaces as deflection surfaces; a pyramidal shape having curved pyramidal surfaces as deflection surfaces; a pyramidal shape having cylindrical surfaces as deflection surfaces; a peak which protrudes into the flow; and a sawtooth shape.

8. The ultrasonic flow sensor of claim 1, wherein the deflection device includes at least one reflection barrier.

9. The ultrasonic flow sensor of claim 1, wherein the deflection device has at least two deflection surfaces which intersect in at least one intersection line, the intersection line being situated at an angle, different from 90°, with respect to a connecting line between the ultrasonic converters.

* * * * *